United States Patent [19]

Limpaecher

[11] 4,414,670
[45] Nov. 8, 1983

[54] E-BEAM MAINTAINED PLASMA DISCHARGE ELECRODES

[75] Inventor: Rudolf Limpaecher, Topsfield, Mass.

[73] Assignee: The United States of America as represented by the Secretary of the Air Force, 06, D.C.

[21] Appl. No.: 306,843

[22] Filed: Sep. 29, 1981

[51] Int. Cl.³ .............................................. H01S 3/22
[52] U.S. Cl. ...................................... 372/58; 372/33; 372/59
[58] Field of Search ................ 372/74, 89, 90, 58-60, 372/33, 85

[56] References Cited

U.S. PATENT DOCUMENTS

| | | | |
|---|---|---|---|
| 3,641,454 | 2/1972 | Krawetz | 331/94.5 |
| 3,666,982 | 5/1972 | Wiegand, Jr. | 313/205 |
| 3,702,973 | 11/1972 | Daugherty et al. | 372/74 |
| 3,789,321 | 1/1974 | Krawetz et al. | 331/94.5 |
| 3,848,202 | 11/1974 | Hyne | 331/94.5 |
| 3,860,887 | 1/1975 | Hoag et al. | 372/74 |

Primary Examiner—James W. Davie
Assistant Examiner—Léon Scott, Jr.
Attorney, Agent, or Firm—Donald J. Singer; John R. Flanagan

[57] ABSTRACT

A flowing gas laser utilizes a multilayer gas flow technique wherein laser gas is caused to flow in three distinct layers: an anode gas flow layer flowing adjacent the anode electrode of the laser; a cathode gas flow layer flowing adjacent the cathode electrode of the laser; and a lasing gas flow layer flowing between the anode and cathode layers and through the lasing region of the laser. A higher electron density is produced in the anode and cathode layers than in the middle lasing layer for fostering a higher electric field in the lasing layer and increased electrical efficiency of the laser. The multilayer gas flow technique is also useful in chemical processing devices for generating ozone or the like.

8 Claims, 4 Drawing Figures

E-BEAM MAINTAINED PLASMA DISCHARGE ELECTRODES

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to high power flowing gas lasers and chemical processing devices and, more particularly, is concerned with the improvement of the electrical efficiency thereof by controlling separately the conductivity of each layer of a multilayer gas flow serving as the sustainer discharge electrodes and the lasing or chemical processing medium.

2. Description of the Prior Art

One form of high power laser employs a lasing gas flow which is perpendicular to both the electrical discharge axis and the optical axis of the laser. This gives rise to a transverse flow configuration, the principal advantage of which being that the lasing gas dwell time in the optical cavity is much shorter than with lasers of other configurations, such as axial flow devices. The result is a laser having the possibility of much higher power density and consequently much more power per unit length of optical cavity.

In such a laser, the lasing gas flow is preionized by an electron beam to make it electrically conducting and thereafter a main, or sustainer, electrical discharge is delivered independently to this conducting region of the gas between two electrodes at a voltage less than the breakdown potential of the lasing gas. Theoretically, an electric discharge should result which is uniform and free of filaments or arcing.

In one embodiment of this transverse flow configuration, such as shown schematically in FIG. 5 of U.S. Pat. No. 3,702,973, the gas ionization is accomplished through use of a large area, low power electron beam which irradiates the optical cavity of the laser. The E-beam is fired perpendicular to both the direction of gas flow and the optical axis. The electrical sustainer discharge is, therefore, in the same direction as the E-beam.

The E-beam/sustainer discharge technique for pumping high power lasers, as just described, has been found to work well for may gas mixtures, and may be used for electrical initiation of high power chemical lasers as well. However, the output power of lasers utilizing this technique is limited by the breakdown of the lasing medium. In other words, an upper limit to the power in the outputted laser beam is imposed by the voltage at which the lasing gas begins to break down. The breakdown appears to be caused by electric field concentration at the cathode screen or rods structure, resulting in formation of streamers across the discharge electrodes.

The consequence of greater likelihood of gas breakdown as the electric discharge field is increased is unfortunate because it has been found that in many laser applications the electrical efficiency increases sharply at higher E/p ratios (electric field to gas pressure). For instance, when using a fluorine gas mixture it was found that arcing occurs with an applied electric field at only 60 percent of the breakdown strength of the gas mixture.

Besides increasing electrical efficiency, an increased electric field is highly desirable in some laser applications to increase energy density and reduce device dimensions. Furthermore, some lasing gas mixtures may only be made to work at an electric field close to their breakdown potentials. Therefore, a need exists to develop a technique to achieve a higher controlled sustainer electric field discharge operation without deleteriously affecting the lasing medium.

SUMMARY OF THE INVENTION

The present invention provides a technique useful in a flowing gas laser designed to satisfy the aforementioned needs. The technique is also useful in chemical processing devices, such as for the generation of ozone or the like. In the present invention, the technique employed is to flow a gas in a laser or chemical processing device in three distinct layers: (a) an anode layer; (b) a cathode layer; and (c) an intermediate layer, such as is useful for lasing or chemical processing, located between the anode and cathode layers. By having a multilayer gas flow, the conductivity of all three layers can be independently controlled. The control can be achieved by controlling both the electron production and the electron loss rate in each layer.

If a higher electron density is maintained in the anode and cathode layers than in the intermediate layer, the electric field will be lower in these boundary layers than in the intermediate layer; furthermore, less energy will be pumped into these (anode and cathode) layers. With this approach the electric field near the gas-solid electrode or conductor interface, specifically at the cathode, can be maintained as a fraction of the breakdown electric field, while the electric field in the intermediate layer is near the gas breakdown potential.

For the intermediate medium layer, the ionized boundary electrode layers act as "plasma anode" and "plasma cathode." The transitions between the three gas layers are gradual without the usual anode and cathode drops. The E-beam, which is transverse to both the gas flow direction and the optical cavity axis, ionizes all three layers.

With this multilayer flow technique, the intermediate gas layer can be pumped by the sustainer electric field discharge with a higher E/p ratio than would be possible by having the intermediate layer directly in contact with the solid sustainer discharge electrodes since at these electrodes, field concentrations tend to raise the field to higher values than the main gap fields. Consequently, with this technique used in a flowing gas laser the electrical efficiency may be increased by as much as 80 percent with higher E/p operation. Notwithstanding the fact that high E/p operation is limited by arcing ultimately, this multilayer flow technique can allow operation at higher E/p ratios than the prior art single layer flow technique.

DETAILED DESCRIPTION OF THE INVENTION

Figure 1:
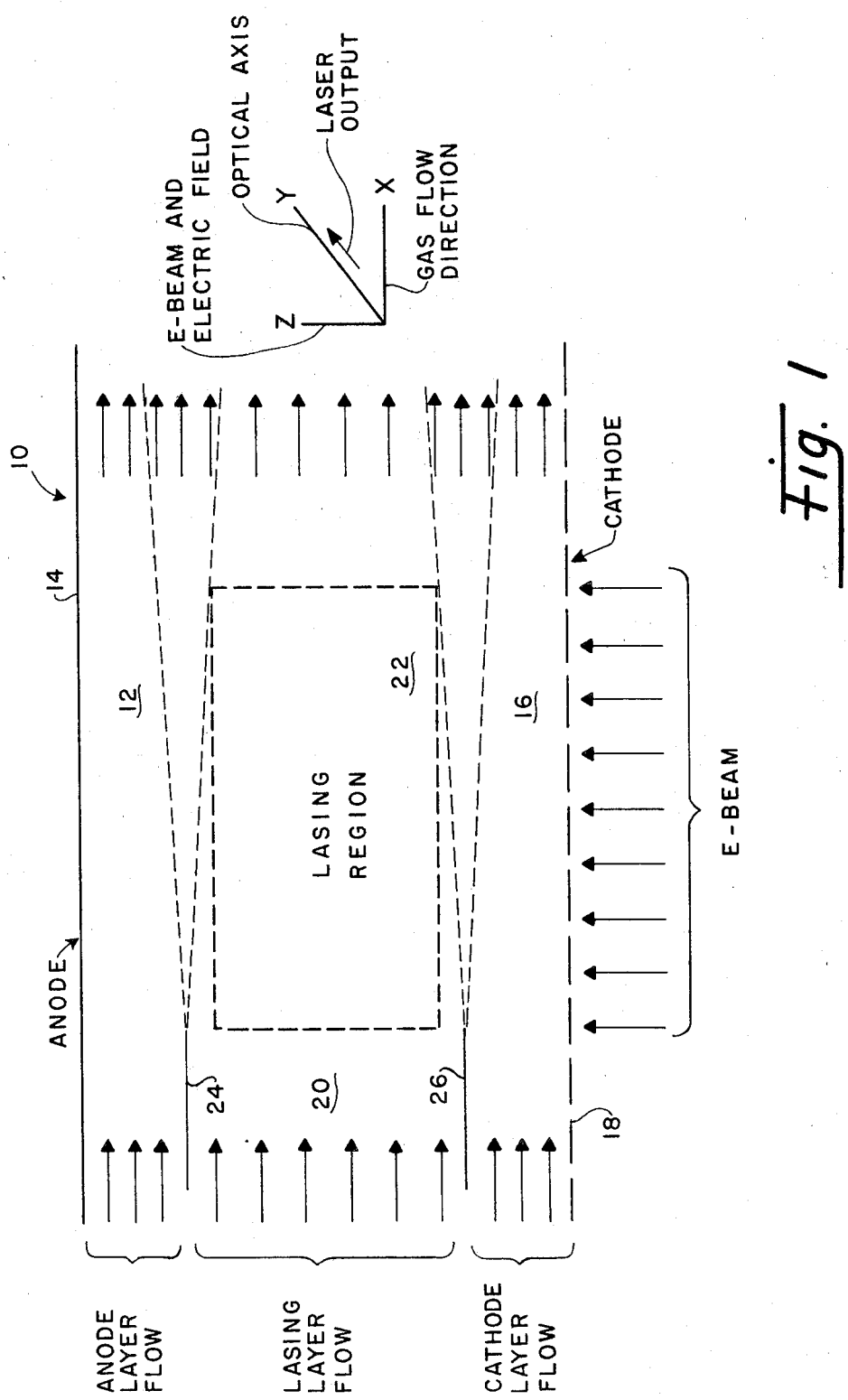
FIG. 1 is a schematical representation of the multilayer gas flow in a laser embodying the technique of the present invention.

Referring now to the drawings, and more particularly to FIG. 1, there is shown in schematical form a multilayer gas flow through the lasing region of a high power laser, generally designated 10, which in an exemplary embodiment may employ the configuration of the laser disclosed and illustrated in aforementioned U.S. Pat. No. 3,702,973. In accordance with the principles of the present invention, the gas is caused to flow in three distinct layers: an anode layer 12 flowing adjacent the anode electrode 14; a cathode layer 16 flowing adjacent the cathode electrode 18; and a lasing layer 20 flowing between the anode and cathode layers and through the lasing region 22 of the laser 10. Means schematically depicted by lines 24 and 26 in FIG. 1, such as independent nozzles or splitter plates, are provided for producing separation of the gas layers as they enter the laser 10 whereby the respective anode and cathode layers are created and maintained by boundary gas dynamic flow effects produced adjacent opposite wall structures of the laser.

The electron or E-beam 24, which is aligned transverse to the optical axis and to the direction of gas flow (see orthogonal X, Y, Z axes in FIG. 1), ionizes all three layers 12, 16 and 20. However, through steps to be described hereinafter, a higher electron density is produced in the anode and cathode boundary layers 12, 16 than in the middle lasing gas layer 20. In effect, the ionized electrode layers act, and are maintained by the E-beam, as a plasma anode and a plasma cathode, respectively. Because of this, less energy will be pumped into the boundary flow layers. As a consequence, the electric sustainer discharge field near the boundary gas/solid electrode interface can be maintained at a fraction of the breakdown electric field while the electric field in the lasing region 22 is near the lasing gas breakdown potential. The field transitions between the boundary gas flow layers 12 and 16 and the lasing layer 20 are gradual, however.

Figure 2:
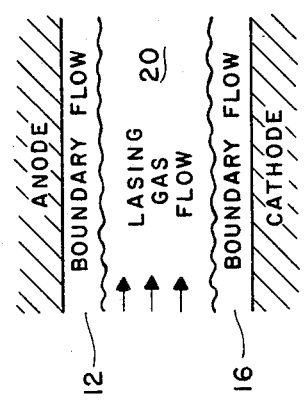
FIG. 2 is a schematical representation of the electron density and electric field profiles for the three-layer gas flow wherein the electron production is determined by the E-beam and the electric field intensity is low.
Figure 2:
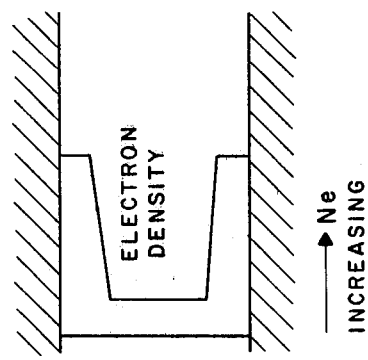
Figure 2:
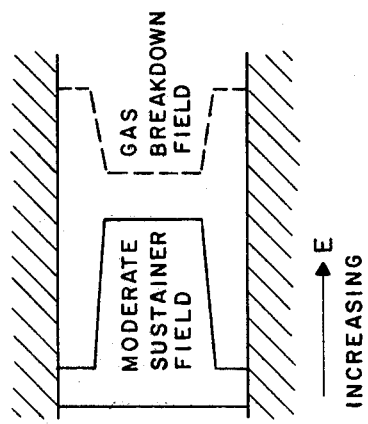
Figure 3:
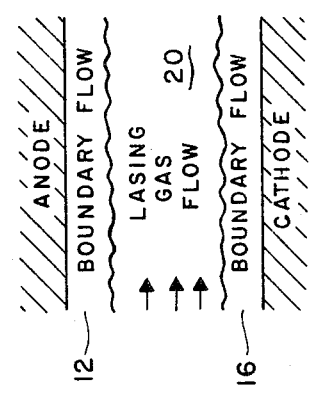
FIG. 3 is a schematical representation similar to that of FIG. 2 but wherein electrons are also produced by the applied sustainer electric field as the electric field intensity is increased.
Figure 3:
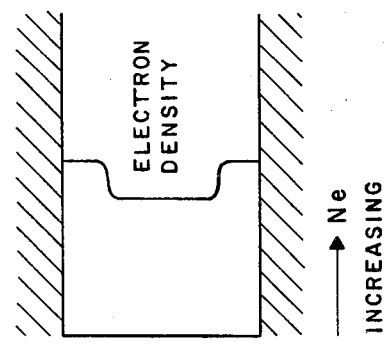
Figure 3:
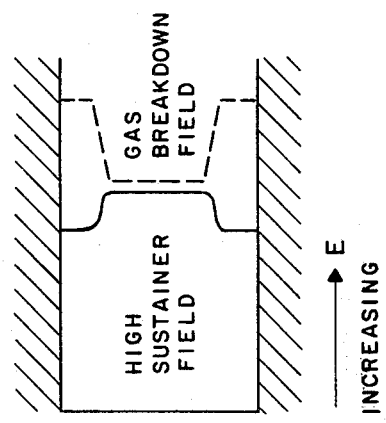

FIGS. 2 and 3 schematically show the electron density (Ne) and electric field (E) profiles across the lasing region between the anode and cathode under the influence of a moderate electric sustainer field and a high electric sustainer field, respectively. With the application of a moderate electric field (moderate E/p ratio), i.e. when the electron production is determined by the E-beam alone, the profile of electron density depicted in FIG. 2 is obtained. In this situation, the electric field in all three layers is proportional to the applied sustainer electric field (recombination and attachment rates are assumed to be independent of the E/p ratio). As the sustainer discharge potential is increased (increasing E/p ratio) to the point where the electric field in the lasing gas approaches the breakdown potential, electrons are also generated by the sustainer discharge in addition to those produced by the E-beam. Any further increase of the external applied sustainer potential will mainly increase the E/p ratio in the boundary layers, as depicted in FIG. 3, while the electric field in the lasing medium will be about at the gas breakdown potential. As this condition is reached, the electron density will increase much faster in the laser medium than the applied electric field. The maximum electron density is reached when the electric field in the anode and cathode-gas interface reaches the breakdown condition. By selecting for the boundary layers 12, 16 a gas with high electrical breakdown and low electron loss rate, a high current (electron) density discharge can be maintained across the electrodes, provided that the lasing gas does not become volumetrically unstable.

The multilayer gas flow technique of the present invention is applicable to both open and closed cycle operation of high power lasers. For open cycle operation, the selection of the gas for the plasma electrode layers is not critical from an electrical standpoint. A helium-nitrogen mixture will in most cases be satisfactory from both the electrical and gas dynamic viewpoints. The appropriate He/N$_2$ ratio may be selected to match the density of the boundary layer flows with that of the lasing mixture such that neither the growth of fluid mechanical instabilities nor turbulent mixing between the boundary layer flows and the lasing layer flow is induced. For closed cycle operation of high power lasers, it is desirable to reuse the gas in both the electrode or boundary layers and the lasing medium layer. Therefore, an electrode layer gas of completely different composition would appear to be undesirable. Techniques where gases are selectively frozen out from the exhaust gases could be used in the situation where it was desired to use different electrode layers and lasing layer gases; however, this approach appears to be disadvantageous from an economic standpoint.

Since it is desirable to change only the electrical property of the electrode or boundary layers, while leaving the gas dynamic properties unchanged, it is preferable to use the same gas mixture in both the lasing medium layer 20 and the electrode layers 12, 16. To achieve the desired electrical property a very small quantity of trace gases may be introduced into the lasing gas layer 20 in order to decrease the electron density in the lasing medium relative to the electron density in the boundary layers. For pulsed and CW CO$_2$ and CO lasers only a fraction of a torr of such gases as HF, F$_2$, and H$_2$O would be required to increase the electric field (decrease the electron density) in the lasing medium layer dramatically.

Figure 4:
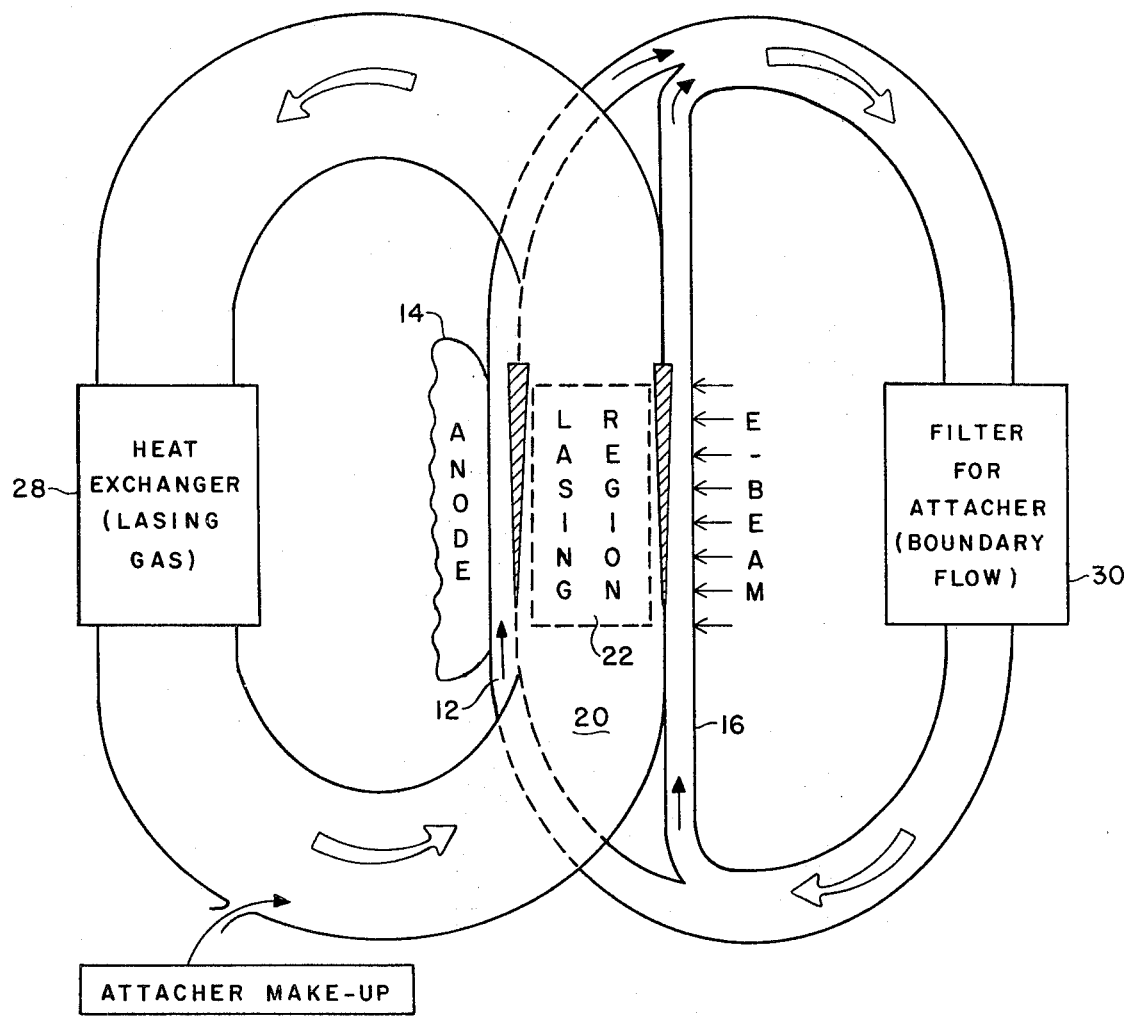
FIG. 4 is a schematical representation of a closed cycle laser system wherein both the gases of the electrode layers and the lasing layer are reusable.

A schematical representation of a closed cycle high power laser system is shown in FIG. 4. Here, two closed cycle flow paths are shown, one for the gas of the boundary layers 12, 16 and the other for the gas of the lasing layer 20. In addition to a heat exchanger 28, a filter 30 is introduced into the path of the recirculating boundary layer gas. Filters such as soda-lime and NaF, activated charcoal, and other numerous dry filters can be selected to filter out the HF, F$_2$ and water, respectively. Since the quantities of trace materials which might be used are economically insignificant, this type of closed cycle operation increases only the construction cost. The benefits of high E/p ratio operation for the CW CO$_2$ laser appear to result in a significant increase of the electrical efficiency, in some cases as much as 80 percent.

It is thought that the multilayer gas flow technique of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. In a flowing gas laser which includes opposite anode and cathode electrodes, the improvement which comprises:
   (a) an anode electrode flowing gas layer;
   (b) a cathode electrode flowing gas layer; and
   (c) an intermediate flowing gas layer forming a lasing medium, located between said anode and cathode electrode flowing gas layers and having a composition which differs from that of said anode and cathode flowing gas layers.

2. The laser as recited in claim 1, wherein said anode layer and said cathode layer each has an electron density which is higher than in said intermediate layer due to the difference in the gas composition of the intermediate layer from that of the anode and cathode layers.

3. The laser as recited in claim 1, wherein said anode layer and said cathode layer each has an electrical conductivity which differs from that of said intermediate layer due to the difference in the gas composition of the intermediate layer from that of the anode and cathode layers.

4. The laser as recited in claim 1, wherein said anode layer and said cathode layer each has an electric field which is lower than in said intermediate layer due to the difference in the gas composition of the intermediate layer from that of the anode and cathode layers.

5. In a flowing gas laser which includes a sustainer discharge anode electrode and a sustainer discharge cathode electrode bounding opposite sides of a lasing region of said laser, the improvement which comprises:
   (a) a first gas layer flowing adjacent said anode electrode;
   (b) a second gas layer flowing adjacent said cathode electrode; and
   (c) a lasing gas layer flowing between said first and second layers and through said lasing region, and having a composition which differs from that of said first and second gas layers.

6. The laser as recited in claim 5, further including means for maintaining the flow path of each of said first and second layers separate from the flow path of said lasing layer.

7. The laser as recited in claim 5, wherein due to the difference in the gas composition of said lasing layer from that of said first and second layers, said layers are ionized such that each of said first layer and said second layer has an electron density which is higher than in said lasing layer.

8. The laser as recited in claim 5, wherein said first and second layers act as a plasma anode and a plasma cathode, respectively.

* * * * *